(12) United States Patent
Wright et al.

(10) Patent No.: US 7,024,569 B1
(45) Date of Patent: Apr. 4, 2006

(54) METHOD AND APPARATUS FOR SUPPLYING AUXILIARY POWER TO A BUS COUPLED PERIPHERAL

(75) Inventors: David G. Wright, Escondido, CA (US); Jeff Chang, San Diego, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 411 days.

(21) Appl. No.: 10/254,433

(22) Filed: Sep. 24, 2002

(51) Int. Cl.
*G06F 13/14* (2006.01)

(52) U.S. Cl. .................. 713/300; 713/320; 713/321; 713/322; 713/323; 713/324

(58) Field of Classification Search .............. 713/300, 713/320–324
See application file for complete search history.

(56) References Cited

U.S. PATENT DOCUMENTS

| | | | | |
|---|---|---|---|---|
| 5,675,813 A * | 10/1997 | Holmdahl | ................. | 713/310 |
| 5,884,086 A * | 3/1999 | Amoni et al. | ............... | 713/300 |
| 6,000,042 A * | 12/1999 | Henrie | ........................ | 714/40 |
| 6,086,430 A * | 7/2000 | Amoni et al. | ............... | 439/680 |
| 6,178,514 B1 * | 1/2001 | Wood | ......................... | 713/300 |
| 6,253,329 B1 * | 6/2001 | Kang | ......................... | 713/300 |
| 6,283,789 B1 * | 9/2001 | Tsai | ........................... | 439/502 |
| 6,357,011 B1 * | 3/2002 | Gilbert | ...................... | 713/300 |
| 6,665,801 B1 * | 12/2003 | Weiss | ........................ | 713/300 |
| 6,708,278 B1 * | 3/2004 | Howard et al. | ............. | 713/323 |
| 2003/0220001 A1 * | 11/2003 | Milan | ......................... | 439/108 |

\* cited by examiner

*Primary Examiner*—A. Elamin

(57) ABSTRACT

A method and apparatus for supplying auxiliary power to a peripheral is disclosed. The method includes supplying power from a first USB port of a host device to an input USB port of a USB hub device, supplying power through a downstream USB port of the USB hub device for use by a downstream USB device, supplying auxiliary power through a power output port of the USB hub device for use by a peripheral device that is coupled to an upstream port and supplying power from a second USB port of the host device to the peripheral device. The power received by the peripheral device is sufficient for its operation.

20 Claims, 8 Drawing Sheets

METHOD AND APPARATUS FOR SUPPLYING AUXILIARY POWER TO A BUS COUPLED PERIPHERAL

FIELD OF THE INVENTION

Embodiments of the present invention relate generally to USB (Universal Serial Bus) peripherals. In particular, an embodiment of the present invention relates to a method and apparatus for increasing the power that is available to a USB peripheral.

BACKGROUND OF THE INVENTION

Peripherals may be connected to a host computer using a USB (Universal Serial Bus). Moreover, peripherals may be connected to a computer through a bus powered USB hub. Bus-powered USB hubs are "high power" USB devices. This means that the total power drawn by the hub itself, together with all downstream devices is limited to 500 mA at the high end.

Many laptops have two USB (Universal Serial Bus) ports that may supply current to downstream sources. These USB ports are configured to each supply 500 mA of operating current to downstream devices. Most conventional mass storage devices require 0.5–1.0A of operating current for operation purposes. Because of this requirement, the limited levels of current that can be supplied from a conventional USB bus are not sufficient to power devices that require more than 500 mA of operating current. Consequently, a typical requirement of such devices is that they be "mains powered", e.g., powered by an AC outlet.

A typical 2.5" HDD (hard disk drive) requires in the range of 0.5–1.0A, at 5 volts to operate. In some cases, the power requirements of CDRW and DVD-ROM drives are similar. However, 5 volt only CDRW and DVD-ROM drives are less common, as these drives typically require both 5 and 12 volts to operate. By contrast, a typical USB-ATAPI (AT attachment packet interface) bridge IC device requires 200–300 mA of operating current at 3.3 volts for operation purposes. Although in time it is likely that the power consumption requirements of CDRW and DVD-ROM drives may fall to a level where 500 mA operation is common, there is an immediate demand for wholly "buspowered" devices, e.g., mass storage devices of the aforementioned types that today require much higher levels of current for operation purposes than is available using conventional USB architecture. It would be advantageous if USB based devices were positioned to meet this demand.

To meet the current demand for wholly bus powered mass storage devices and other type devices, usage models must be developed that allow such devices to be powered by relying solely on the power supplied from USB host devices through conventional USB ports. This should be accomplished despite the limited levels of current conventionally provided by USB host devices through such ports.

A typical usage model provides that one of the ports of a USB host device, such as a laptop, be used to connect a system device, such as a mouse, and the other port be used to connect other peripherals such as USB cameras, PDAs, and the various types of mass storage devices. A disadvantage of this conventional architecture is the typical requirement that the peripheral be "mains powered". This requirement is not practical for most mobile usage models because the remote availability of such sources of power may not exist. In addition, where rechargeable batteries are used to provide the required additional power, significant additions to the cost, weight and bulk of the peripheral package consequently result. Moreover, when mass storage devices having lower power requirements do become available, they are likely to be substantially more costly than are the currently available drives.

SUMMARY OF THE INVENTION

Accordingly, a need exists for a bus powered method and apparatus for supplying auxiliary power to a bus coupled peripheral. The present invention provides a method and system that accomplishes this need.

For instance, one embodiment of the present invention provides a method and apparatus for supplying auxiliary power to a peripheral thereby allowing the peripheral to be completely bus powered even though the peripheral requires more current than that supplied by a single communication port, e.g., a USB port. The method includes supplying power from a first USB port of a host device to an upstream USB port of a USB hub device, supplying power through a downstream USB port of said USB hub device for use by a downstream USB device, supplying auxiliary power through a power output port of said USB hub device for use by a peripheral device that is coupled to said power output port and supplying power from a second USB port of said host device to said peripheral device. The power received by the peripheral device is then sufficient for its operation, making the peripheral totally USB powered.

According to one exemplary usage model, the user may connect the hub to one USB host port, the mouse to the downstream port of the hub, connect a USB device requiring more than 500 mA to the other USB host port and then connect the hub power output to an auxiliary power input of the USB device. In this way surplus power can be delivered from the USB hub to the USB device that requires the additional power.

In one embodiment, the peripheral device is a hard disk drive. The hard disk drive is supplied power by the host device and also receives auxiliary power through an power output port of the USB hub device. By receiving power from both sources, the hard disk drive is able to be totally bus powered even though it requires more power than supplied to it over the host USB device connection.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

EXEMPLARY SYSTEM IN ACCORDANCE WITH EMBODIMENTS OF THE INVENTION

Figure 1:
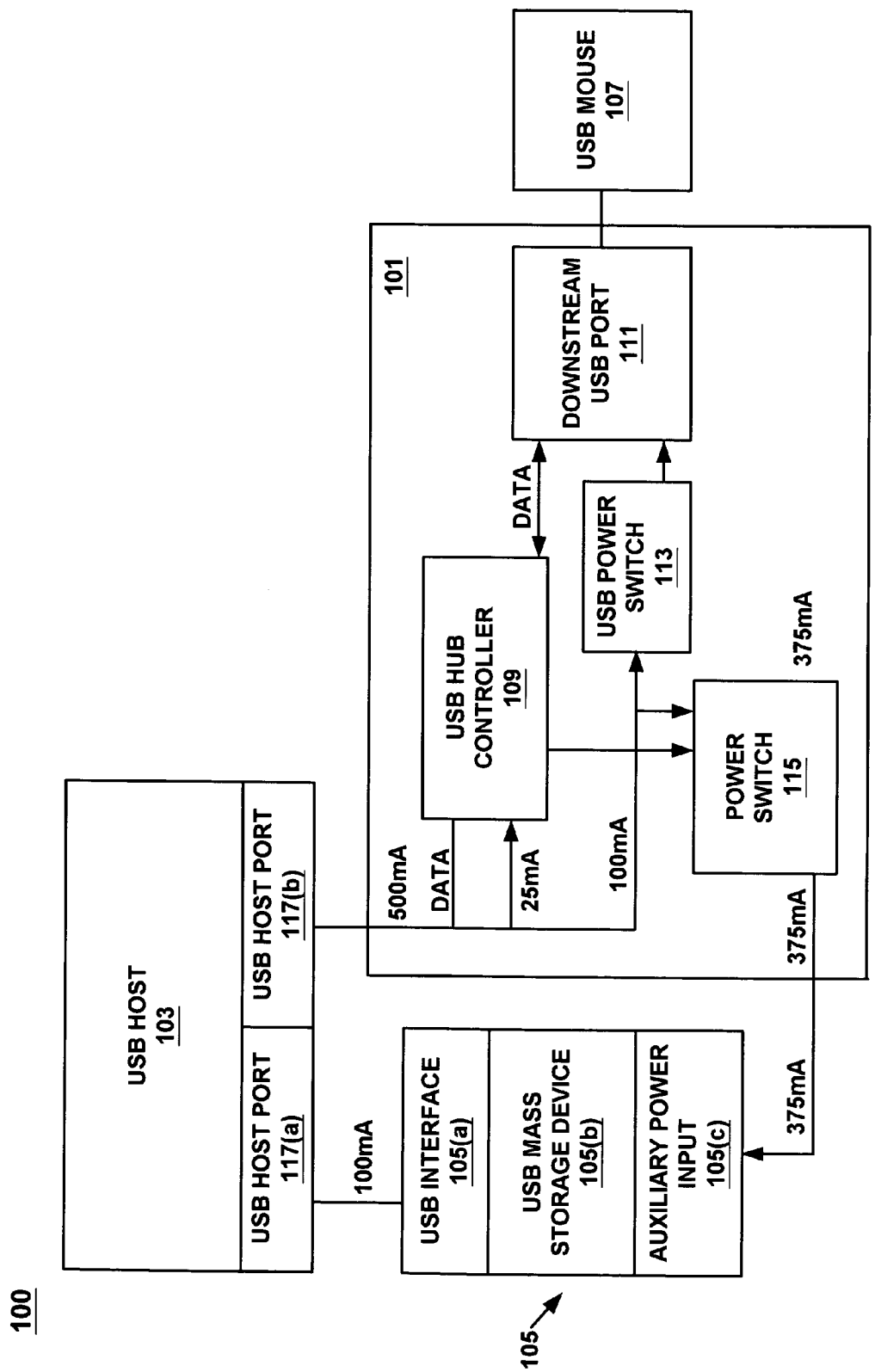
FIG. 1 shows a schematic of a system of electronic components including a hub device configured according to one embodiment of the present invention.

FIG. 1 shows a schematic of a system of electronic components 100 including a USB (universal serial bus) hub device configured according to one embodiment of the present invention. USB host, e.g., laptop or desktop computer, 103, has two ports 117(a) and 117(b). A USB hub 101 is connected to port 117(b), and a high powered peripheral device 105 is coupled to port 117(a). In many instances, a high powered peripheral device may require more than the 500 mA of operating power that may be supplied by its connection to an individual host port. According to one embodiment of the present invention, surplus current that may be drawn by USB hub 101 from its connection to host port 117(b) may be supplied to such peripherals (e.g., 105) to supplement the power requirements of the peripheral. According to such embodiments, the surplus current supplied by USB hub 101 may augment the current supplied to peripheral 105 through host port 117(a), thereby producing a combined measure of power sufficient to fully power the device. Consequently, one embodiment of the present invention allows a peripheral to be completely bus powered, relying only on the current supplied to it from a direct connection to a first USB host port (e.g., 117(a)) and an indirect connection to a second USB host port (e.g., 117(b)) through USB hub 101, even though the peripheral 105 requires more power than the host can supply through a single USB port connected to the peripheral.

Referring to FIG. 1 there is shown USB hub 101, USB hub controller 109, downstream USB port 111, USB power switch 113, power switch 115, USB mouse 107, USB host 103, USB ports 117(a) and 117(b), USB peripheral 105, USB interface 105(a), mass storage device 105(b), and auxiliary power input 105(c).

USB hub 101 comprises USB hub controller 109, downstream USB port 111, USB power switch 113, and power switch 115 coupled to an upstream port. According to one embodiment, USB hub controller 109 may receive data signals (e.g., communication signals) and power inputs from USB host port 117(b) and may control the flow of data and power through USB hub 101. According to one embodiment, USB hub controller 109 passes data to, and from, USB mouse 107 through downstream USB port 111. According to such embodiments, USB hub controller 109 enables the flow of power to USB mouse 107 through the downstream USB port 111 by activating USB power switch 113. In addition, USB hub controller 109 enables the flow of current to peripheral device 105 by activating power switch 115. According to one embodiment, surplus or spare current supplied from USB hub 101 may be delivered to an auxiliary input 105(c) of peripheral device 105 via power switch 115 as described herein.

Power switch 115 supplies surplus current drawn by the USB hub 101 to peripheral device 105. As previously mentioned, power switch 115 may be activated by USB hub controller 109. In one embodiment, power switch 115 may be used to facilitate the placing of the USB hub 101 in a low power standby mode (by the host) without having to similarly adjust power supplied via auxiliary power input 105(c) to a power dependent peripheral (e.g., USB mass storage device 105(b)). In alternate embodiments of the present invention, where such operations are sufficiently unlikely, the power switch 115 may be unnecessary.

USB power switch 113 supplies a portion of the current drawn by USB hub 101 to an external device 107 via downstream port 111. As previously mentioned, USB power switch 113 is enabled by USB hub controller 109. According to one embodiment, 100 mA of power may be supplied through power switch 113.

Downstream USB Port 111 receives data/communication signals (see FIG. 1) from USB hub controller 109 and a power input from USB power switch 113. The data signal and power input are supplied to external device 107.

In accordance with one embodiment, USB hub controller 109, may report a set of descriptors to USB host 103, indicating that it is bus powered, that it has a single downstream port, and that it may require 400 mA. In one embodiment, bus powered hubs may not be required to perform overcurrent detection. If not, this information may be reported along with the reporting of the descriptor set. In alternate embodiments, overcurrent protection may be provided.

According to one embodiment of the present invention, USB hub 101 may be a "high power" USB device. According to such embodiments, the total power drawn by the hub itself, together with all downstream devices (e.g., 107), in some applications may not exceed 500 mA. Each downstream port 111 may be required to supply up to 100 mA. Therefore, a single port bus powered USB hub may make available 100 mA to a downstream device, and may consume up to 400 mA itself. According to one embodiment, the USB hub may consume around 25 mA. Therefore, 375 mA of spare current may be made available for supply to peripheral 105 according to such embodiments. It should be appreciated that, current supplied to downstream devices (e.g., 107) may be supplied via a USB power switch (e.g., 113) as is described above.

USB host 103 may include but is not limited to PCs, laptops etc. Its USB host ports 117(a) and 117(b) facilitate connection to USB hub 101 via the hub's upstream connection, and to peripheral 105 (e.g., USB mass storage device 105(b)) via USB interface 105(a). According to one embodiment of the present invention, each individual host port may provide 500 mA of current to a peripheral (e.g., 105).

Peripheral 105 may include but is not limited to a mass storage device 105(b) that includes a USB interface 105(a) and an auxiliary power input 105(c) according to one embodiment of the present invention. Additionally, peripheral 105 may include but is not limited to a camera system, printer, memory card reader, data input device, data reproduction device, etc. According to one embodiment, the peripheral 105 may receive surplus current supplied to it from USB hub 101 through the auxiliary input 105(c). The current thus supplied may serve to augment the current supplied to it from host port 117(a). Such current may be derived from USB hub 101 to power a USB peripheral function such as USB mass storage device 105(b) when the USB port cannot provide sufficient current to power the peripheral function. The total current supplied to the peripheral according to this embodiment of the present invention may be calculated using the formula:

$$P_{Total} = P_{USB\ HUB\ EXTERNAL\ OUTPUT} + P_{USB\ HOST\ PORT\ OUTPUT}.$$

External device 107 receives data signals and power inputs via downstream USB port 111. According to one embodiment, 100 mA of power may be supplied to external device 107. External device 107 may include but is not limited to a USB mouse.

Figure 2:
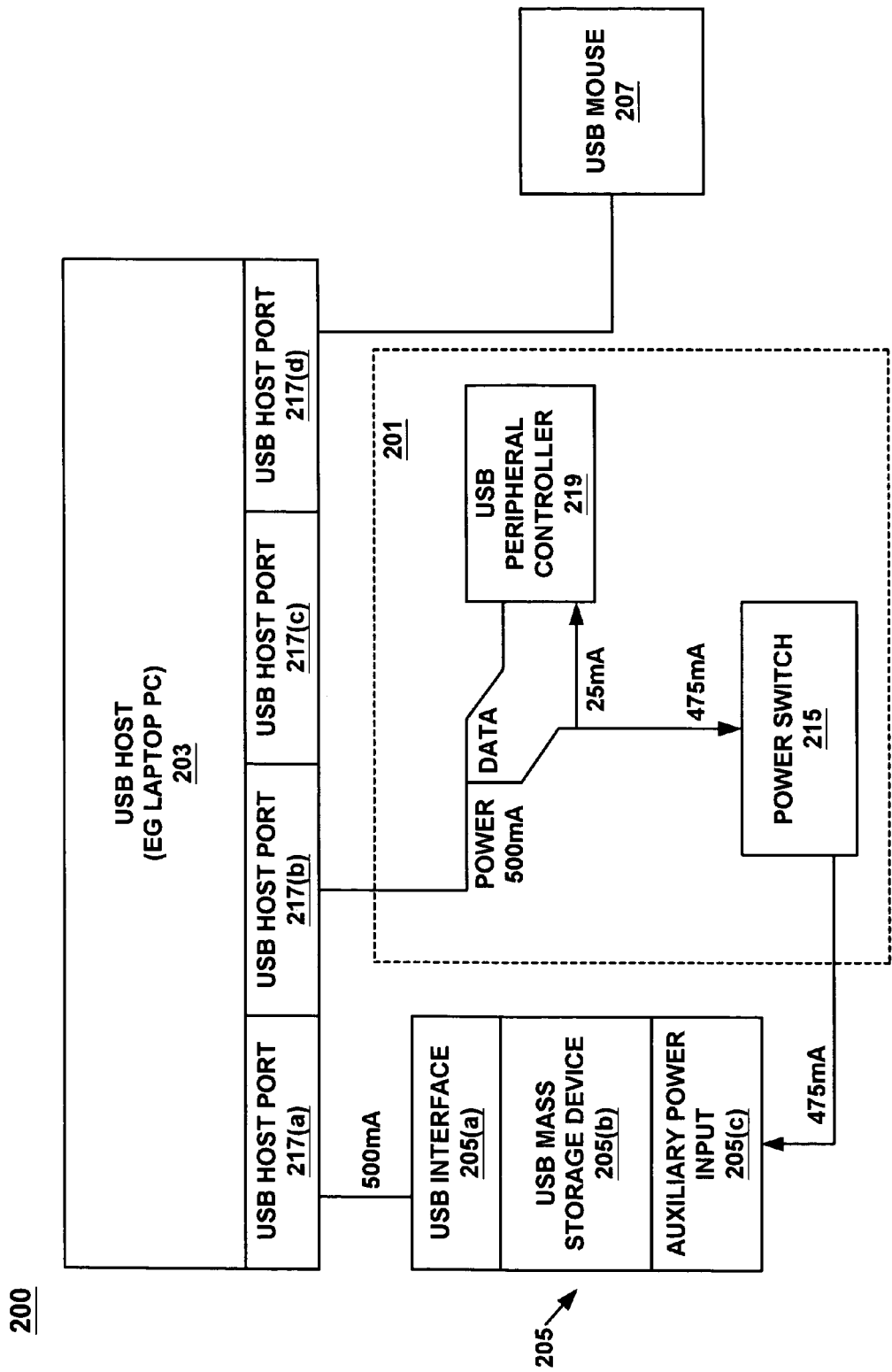
FIG. 2 shows a schematic of a system of electronic components configured according to one embodiment of the present invention.

In cases where it is not necessary to provide a downstream peripheral port (for example if laptops with four USB ports are provided that allow the use of an unused host port to connect a mouse or other commonly used peripheral), the hub could be replaced by a USB peripheral. A block diagram of such an embodiment 200 is discussed with reference to FIG. 2 below. Referring to FIG. 2, USB peripheral 201 is similar to USB hub 101 of FIG. 1 except USB peripheral 201 contains no hub controller and downstream port because external device 207 is allowed a direct connection to host device 203. Since USB peripheral 201 does not need to supply downstream power, it can make more power available to the peripheral device 205(b).

FIG. 2 is a schematic of computer system components 200 configured according to one embodiment of the present invention. USB host, e.g., laptop or desktop computer, 203, has four ports 217(a)–217(d). A USB peripheral 201 is connected to port 217(b), and a high powered peripheral device 205 is coupled to port 217(a). An external device 207 is advantageously connected to USB host port 217(d). Host port 217(c) shown in FIG. 2 is unused. According to one embodiment of the present invention, surplus current that may be drawn by USB peripheral 201 from its connection to host port 217(b) may be supplied to a peripheral (e.g., 205) that requires more operating power than can be supplied through a connection to a single USB host port. According to such embodiments, the surplus current supplied by USB peripheral 201 may augment the current supplied to peripheral 205 through port 217(a), thereby producing a combined measure of power sufficient to fully power the device from the USB host port 217(a) alone. Consequently, the arrangement of this embodiment of the present invention allows a peripheral (e.g., 205) to be completely bus powered, relying only on the power supplied to it from a direct connection to a first USB host port (e.g., 217(a)) and an indirect connection to a second USB host port (e.g., 217(b)) through USB peripheral 201.

Referring to FIG. 2, there is shown USB peripheral 201, including USB peripheral controller 219, and power switch 215, USB host 203, including USB host ports 217(a)–217(d), peripheral 205, including USB interface 205(a), USB mass storage device 205(b), and auxiliary power input 205(c), and external device 207. In the embodiment shown in FIG. 2, external device 207 may include but is not limited to a USB mouse, while the peripheral device 205 may include but is not limited to a mass storage device 205(b) such as is shown in FIG. 2.

As previously mentioned, USB peripheral 201 includes USB controller 219, and power switch 215. According to one embodiment, USB peripheral controller 219 may receive data signals (e.g., communication signals) and power inputs (see FIG. 2) from USB host port 217(b). USB peripheral 201 may draw 500 mA of current from USB host port 217(b), and may consume 25 mA of the current drawn according to one embodiment. USB peripheral controller 219 enables the flow of power (e.g., 475 mA) to peripheral device 205 by activating power switch 215. According to one embodiment, surplus or spare current supplied from USB peripheral 201 may be delivered to peripheral device 205 via power switch 215 as is described herein.

Power switch 215 supplies surplus current drawn by the USB hub 201 to peripheral device 205. According to one embodiment of the present invention, 475 mA of spare current may be supplied through power switch 215 (e.g., 500 mA drawn by USB peripheral 201 minus 25 mA consumed by USB peripheral 201). As previously mentioned, power switch 215 may be activated by USB peripheral controller 219. In one embodiment, power switch 215 may be used to facilitate the placing of the USB peripheral in a low power standby mode (by the host) without having to similarly adjust power supplied via auxiliary power input 205(c) to a power dependent peripheral (e.g., USB mass storage device 205). In alternate embodiments of the present invention, where such operations are sufficiently unlikely, the power switch 215 may be unnecessary.

USB host 203 may include but is not limited to PCs, laptops etc. Its USB host ports 217(a)–217(d) facilitate connection to USB peripheral 201 via an upstream connection, and to peripheral 205 (e.g., USB mass storage device 205 via USB interface 205(a). According to one embodiment of the present invention, each individual host port may supply 500 mA of current.

Peripheral 205 may include but is not limited to a USB mass storage device 205 such as that shown in FIG. 2. Additionally, peripheral 105 may include but is not limited to a camera system, printer, memory card reader, data input device, data reproduction device, etc. The embodiment shown in FIG. 2 includes a USB interface 205(a) and an auxiliary power input 205(c). According to one embodiment, the peripheral 205 may receive surplus current supplied to it from USB peripheral 201. The current thus supplied may augment the current supplied to it from host port 217(a). Such current may be derived from USB peripheral 201 in order to power a USB peripheral function such as USB mass storage device 205 when the USB port cannot by itself provide sufficient current to power the peripheral function.

The total current supplied to the peripheral according to this embodiment of the present invention may be calculated using the formula:

$$P_{Total} = P_{USB\ PERIPHERAL\ OUTPUT} + P_{USB\ HOST\ PORT\ OUTPUT}.$$

External device 207 receives data and power inputs via USB host port 217(d). According to one embodiment, 100 mA of power may be drawn by external device 207. External device 207 may include but is not limited to a USB mouse but could be any bus connected peripheral.

In the embodiment of FIG. 2, an output power switch 215 may be necessary because the USB peripheral is required to consume no more than 100 mA when not configured, and no more than 500uA in suspend mode. According to one embodiment, the peripheral controller may enumerate the USB peripheral as a vendor specific device type, having a maximum current rating of 500 mA. Non hub and hub embodiments of the present invention, may be implemented either as a structure separate from the mass storage device, or may be integrated with the mass storage device into a single package.

In another embodiment, featuring a non USB implementation, power may be drawn from ports which do not supply DC power. According to this embodiment, power may be supplied to the peripherals by drawing power from signaling pins. This may be done by configuring the signaling pins to output a steady state signal (e.g., a 5v logic 1 wrt electrical ground), and extracting power from the pins by loading the static signal outputs. In an alternate embodiment, signal lines may be made to continuously transmit data patterns. According to this embodiment, energy may be extracted from such AC signals by means that include but are not limited to rectification, charging a capacitor through a diode, etc. PC peripheral ports that may be utilized to deliver power in this way include but are not limited to VGA video outputs, serial (RS232) ports, parallel (printer) ports, Ethernet ports, modem ports, and audio outputs.

In yet another embodiment of the present invention, power may be derived from a USB bus as is described herein to power a non USB peripheral function that may be attached to a non USB port. Such arrangements may be provided, according to one embodiment, when the USB port cannot provide sufficient current to power the peripheral function. Examples include analog loudspeakers incorporating power amplifiers, Ethernet hubs that are used to connect two laptops together and 1394 devices.

Figure 3:
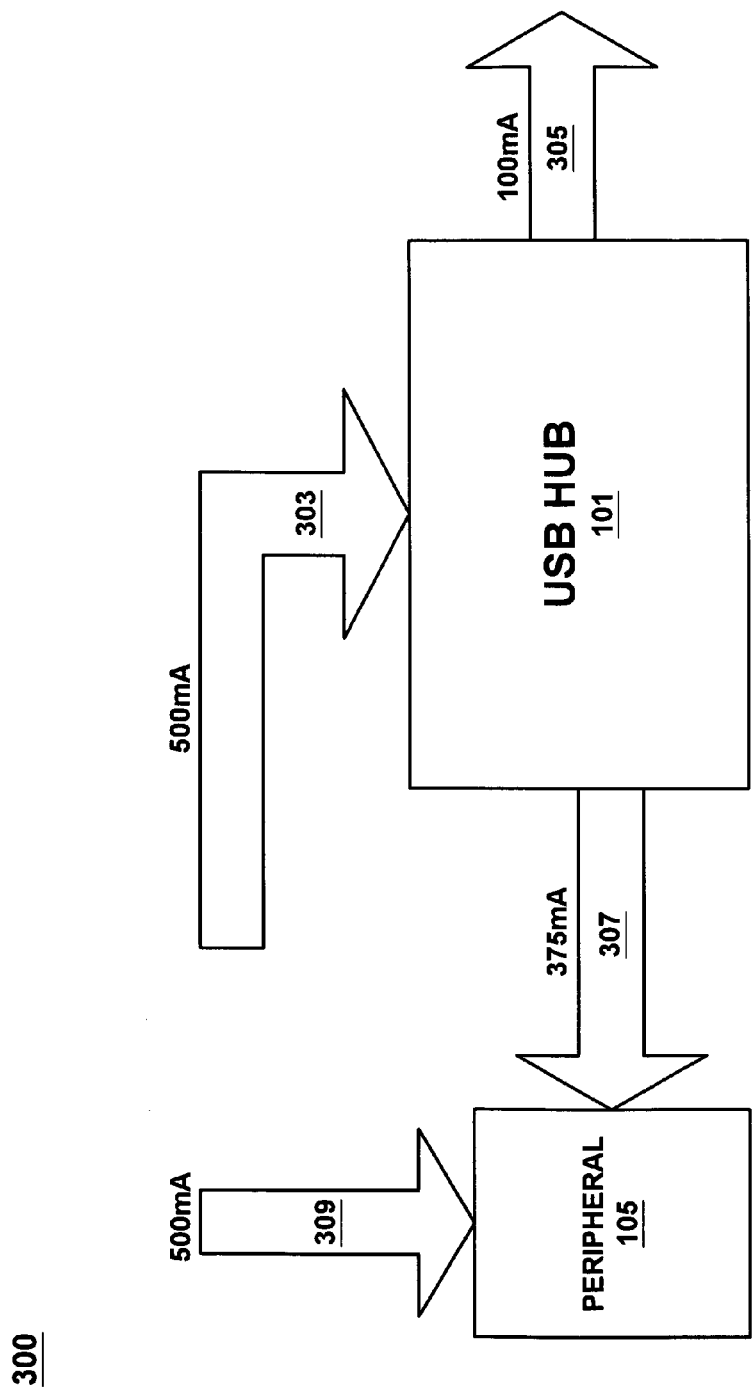
FIG. 3 is a logical diagram of the input and output current characteristics of a one port USB (Universal Serial Bus) hub and the current inputs to a peripheral according to one embodiment of the present invention.

FIG. 3 is a logical diagram 300 illustrating the input and output current characteristics of a USB hub according to one embodiment of the present invention. FIG. 3 shows USB hub device 101, peripheral 105, power input 303, downstream power output 305, upstream power output 307 and power input 309.

Referring to FIG. 3, USB hub device 101 may receive a 500 mA power input 303 from an upstream port and deliver a 100 mA power output 305 to a downstream port, according to exemplary embodiments of the present invention. As is shown in FIG. 3, from the surplus current, a 375 mA power output to an upstream port 307 may be delivered to a peripheral device. According to such embodiments, USB hub device 101 may consume 25 mA of power, thus accounting for the shortfall between the 400 mA of surplus current generated, and the 375 mA available for delivery to the upstream port. The 375 mA of power supplied to peripheral 101 may augment the power input 309 (e.g., 500 mA in the embodiment shown) received from other sources to provide a measure of current sufficient to power peripheral 105 from the bus alone. Consequently, the peripheral 105 may thereby be wholly USB powered.

It should be appreciated that the USB hub of the present invention is considered to be a "high power" USB device. As such the total power drawn by the hub itself, together with all downstream devices may, according to some embodiments, not exceed 500 mA. According to such embodiments, each downstream port may be required to be able to supply up to 100 mA. Therefore, a single port bus powered USB hub may make available 100 mA to a downstream device, and can consume up to 400 mA itself, or deliver 375 mA of surplus current (400 mA minus the 25 mA that such devices may consume) to a peripheral device, as is described herein with reference to FIG. 1. Therefore, the peripheral device can be totally USB powered.

Figure 4:
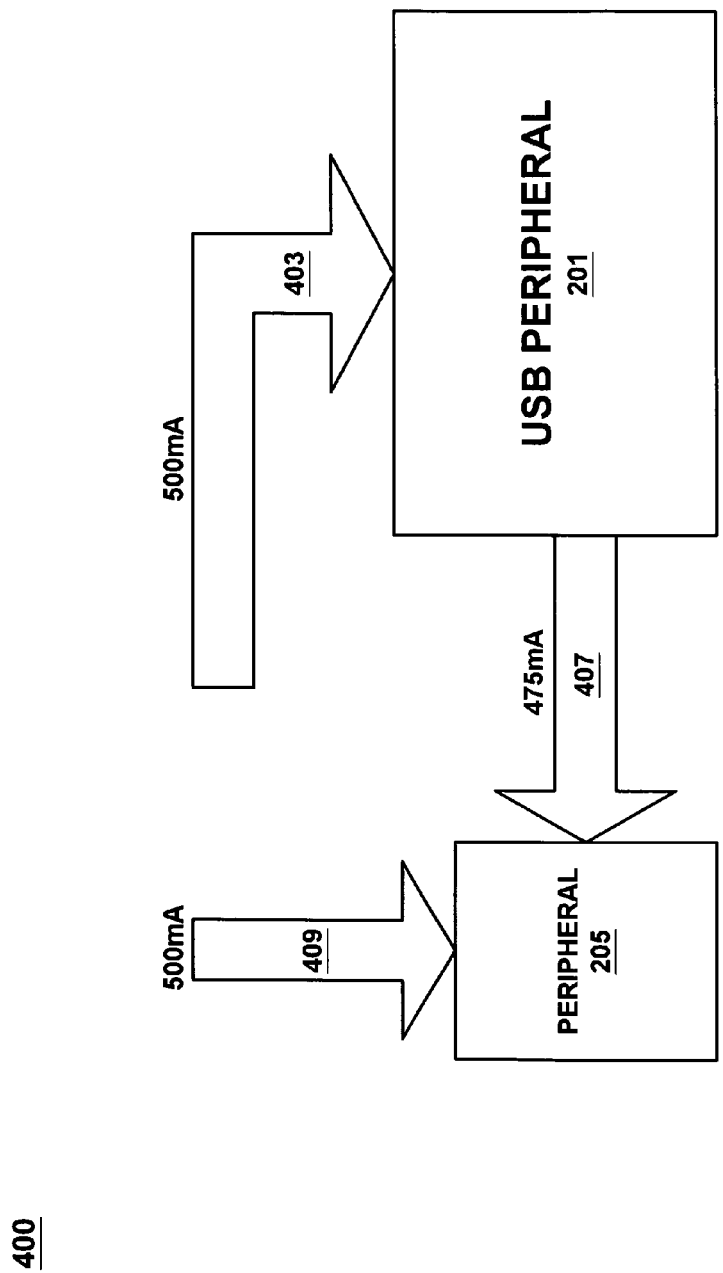
FIG. 4 is a logical diagram of the input and output current characteristics of a USB peripheral and the current inputs to a peripheral according to one embodiment of the present invention.

FIG. 4 is a logical diagram 400 illustrating the input and output current characteristics of a USB peripheral according to one embodiment of the present invention. FIG. 4 shows USB peripheral 201, peripheral 205, power input 403, upstream power output 407 and power input 409.

According to the embodiment illustrated in FIG. 4, USB peripheral 201 may be configured to supply current to a single peripheral device 205, without supplying current to other external devices. In such embodiments, the USB device may be configured to receive as is shown in FIG. 4, a 500 mA power input 403 into an upstream port, and deliver a 475 mA power output 407 to an upstream port. The 475 mA of power supplied to peripheral 201 may augment the power supplied by power input 309 (e.g., 500 mA in the embodiment shown) received from other sources to provide a measure of current sufficient to power peripheral 205. Such an arrangement is described herein with reference to FIG. 2.

EXEMPLARY OPERATIONS IN ACCORDANCE WITH EMBODIMENTS OF THE INVENTION

Figure 5:
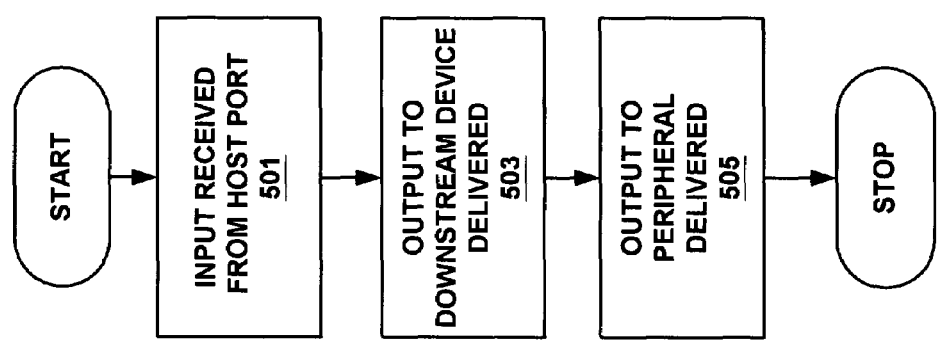
FIG. 5 is a flowchart showing steps performed in a process of increasing power available to a USB peripheral according to the embodiment of the invention described with reference to FIG. 1.

FIG. 5 shows a flowchart 500 of steps performed in process of increasing power available to a USB peripheral according to one embodiment of the invention described herein with reference to FIG. 1.

At step 501, an input connection from a first USB host port is received by a USB device via a first USB host port. According to one embodiment, the input is provided to a power switch that may deliver surplus power to a power output port for a peripheral device (e.g., 105).

At step 503, an output from the USB device to a downstream device (e.g., 107) is delivered. According to one embodiment of the present invention, the output is delivered via a downstream USB port (e.g., 111). According to such embodiment, 100 mA is provided over the USB port to the downstream device.

At step 505, an output to a peripheral that is connected to a second USB host port is delivered. According to one embodiment, the first USB host port and the second USB host port are provided by the same USB host device. The surplus output current may be delivered via an upstream power switch. It should be appreciated that the total power thus delivered to the peripheral is:

$$P_{Total} = P_{USB\ HUB\ POWER\ OUTPUT} + P_{USB\ HOST\ PORT\ OUTPUT}.$$

Figure 6:
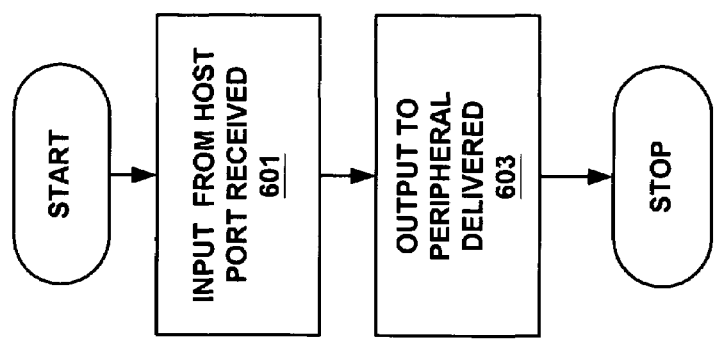
FIG. 6 is a flowchart showing steps performed in a process of increasing power available to a USB peripheral according to the embodiment of the invention described with reference to FIG. 2.

FIG. 6 shows a flowchart 600 of steps performed in a process of increasing power available to a USB peripheral according to one embodiment of the invention described with reference to FIG. 2.

At step 601, an input from a first USB host port is received. According to one embodiment, this input may be delivered to a power switch for delivery to a peripheral device (e.g., 205).

At step 603, an output to a peripheral connected to a second USB host port is delivered. According to one embodiment, the first USB host port and the second USB host port may be provided by the same USB host device. The total current supplied to the peripheral according to this embodiment of the present invention may be calculated using the formula:

$$P_{Total} = P_{USB\ PERIPHERAL\ OUTPUT} + P_{USB\ HOST\ PORT\ OUTPUT}.$$

As noted above with reference to exemplary embodiments thereof, embodiments of the present invention provide a method and apparatus for supplying auxiliary power to a bus coupled peripheral. The method includes supplying power from a first USB port of a host device to an upstream USB port of a USB hub device, supplying power through a downstream USB port of said USB hub device for use by a downstream USB device, supplying auxiliary power through an power output port of said USB hub device for use by a peripheral device that is coupled to said power output port and supplying power from a second USB port of said host device to said peripheral device. The power received by the peripheral device is sufficient for its operation.

It should be appreciated that although the embodiments heretofore discussed have focussed on USB mass storage devices, alternative embodiments employing other type USB devices which may utilize between 500 and 900 mA of current are envisaged.

Figure 7:
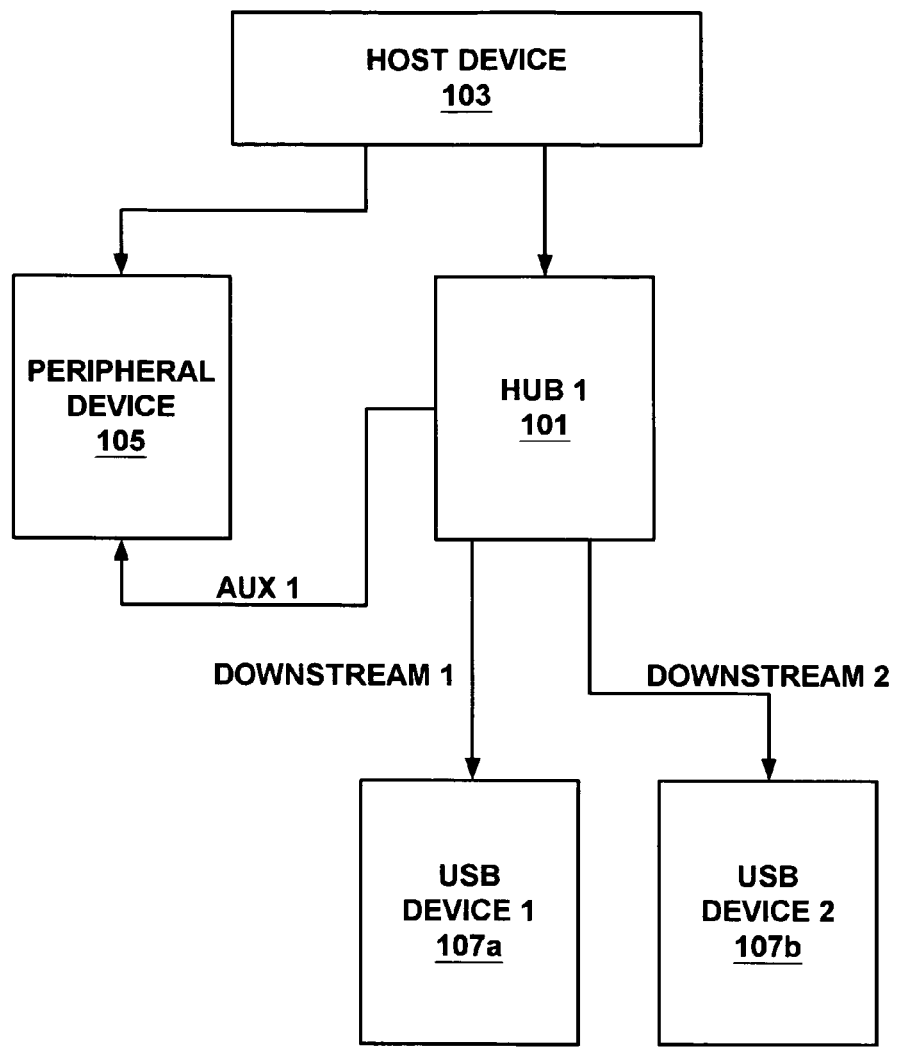
FIG. 7 shows a system of electronic components according to an alternate embodiment of the present invention.

FIG. 7 shows a system of electronic components according to an alternate embodiment of the present invention. In the embodiment shown in FIG. 7 a plurality of down stream hub ports can be provided in the USB hub 101. In this example, peripherals 107(*a*) and 107(*b*) are coupled to downstream ports of hub 101. The auxiliary power is then supplied to peripheral device 105. Although this can mean that the power available on a power output port to the peripheral may be reduced, the use of a mass storage device, according to this embodiment, may not reduce the number of available USB ports from the host. In an alternate embodiment, USB hub can be incorporated within the housing of the mass storage device. Referring to FIG. 7, there is shown host device 103, hub 1 (e.g. 101), peripheral device 105, downstream USB device1 107(*a*) and downstream USB device2 107(*b*).

Host device 103 may supply 500 mA of current to hub1 (e.g., 101). Its USB host ports (e.g., 117(*a*) and 117(*b*) shown in FIG. 1) facilitate connection to hub1 101 via an upstream connection, and to peripheral device 105.

Hub1 (e.g., 101) may supply 100 mA of current through each of a plurality of downstream hub ports (the outputs of which are labeled in FIG. 7 as downstream1 and downstream2). Consequently, hub1 may power a plurality of downstream devices (e.g., 107(*a*) and 107(*b*)). In addition, hub1 (e.g., 101) may supply auxiliary power in the form of surplus current to peripheral 105. In the embodiment shown in FIG. 7, hub1 (e.g., 101) may deliver 275 mA (500 mA drawn form host device 103 minus 25 mA consumed and 100 mA supplied to each of the external devices USB device1 and USB device2) of current to supplement the current supplied to peripheral device 105 from host device 103 thereby enabling peripheral 105 to operate from power wholly supplied through bus connections.

Peripheral 105 receives current inputs from host device 103 and hub1 (e.g. 101). The peripheral 105 may receive 275 mA of surplus current supplied to it from hub1 through its auxiliary input port. According to one embodiment, the current thus supplied may serve to augment the current (e.g., 500 mA) supplied to it from a host port.

Figure 8:
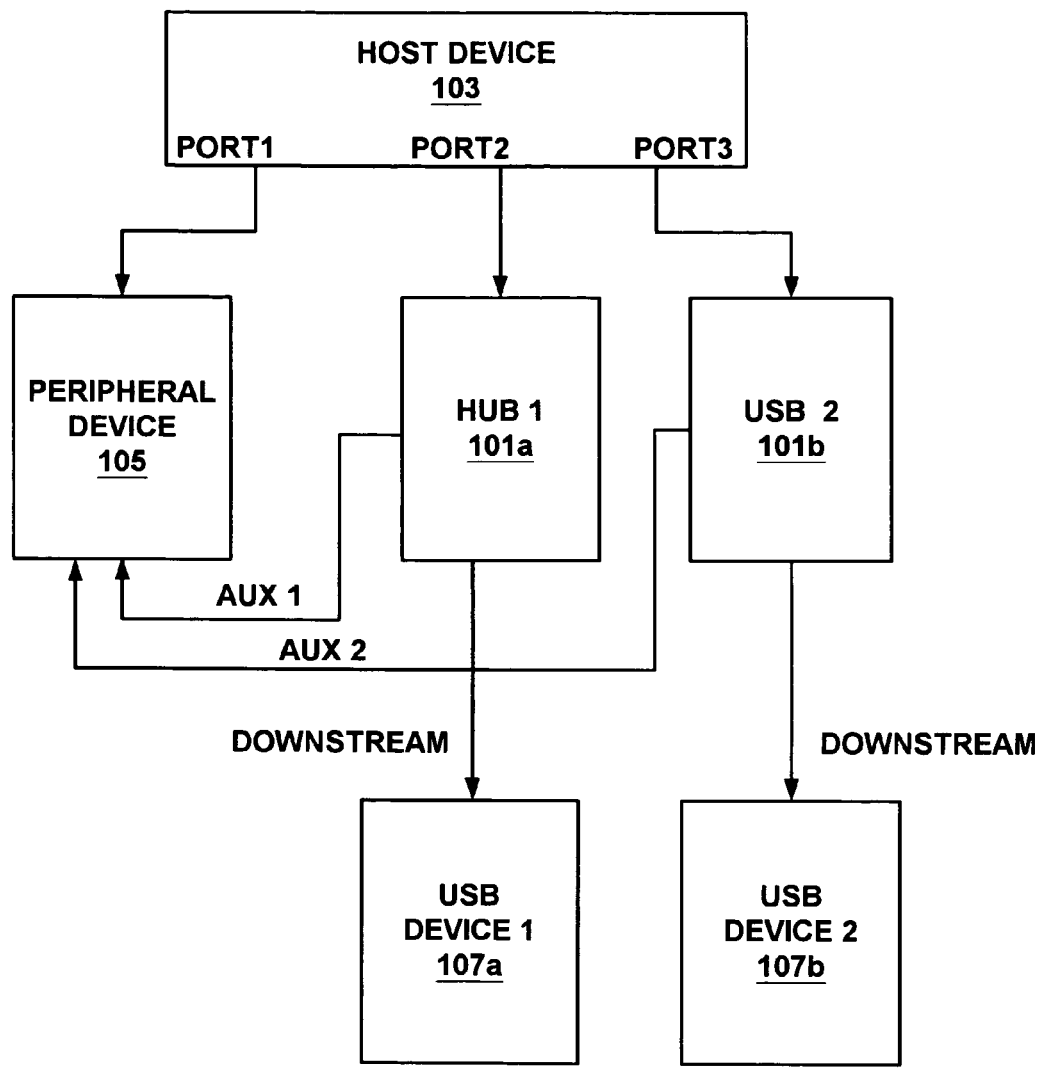
FIG. 8 shows a system of electronic components according to an alternate embodiment of the present invention.

FIG. 8 shows a system of electronic components according to an alternate embodiment of the present invention. In the embodiment shown in FIG. 8, multiple instances of the invention may be used together to increase the power available to a peripheral function. It should be appreciated that although a preferred embodiment of the invention is implemented as a USB 1.1 hub, in an alternative embodiment a USB 2.0 hub may be utilized. Referring to FIG. 8 there is shown host device 103 having a plurality of host ports (labeled port1–port3 in FIG. 8), peripheral device 105, hub1 101(*a*), hub2 101(*b*), USB device1 107(*a*), and USB device2 107(*b*).

Host device 103 may supply 500 mA of current through each of its plurality of host ports (see FIG. 8 port1–port3). Its USB host ports (e.g., port1–port3) facilitate connection not only to hubs 101(*a*) and 101(*b*) but also to peripheral 105. According to the embodiment shown in FIG. 8 peripheral 105 is connected to Port1, hub1 101(*a*) is connected to port2 and hub2 101(*b*) is connected to port3. As mentioned previously host device 103 may include but is not limited to laptops, PCs etc.

According to the embodiment shown in FIG. 8 hub1 101(*a*) may supply 100 mA of the 500 mA of current drawn from host device 103 to external device 107(*a*). In addition 375 mA of surplus current may be supplied to peripheral 105 by hub1 (500 mA minus 25 mA consumed minus 100 mA supplied to external device 107(*a*)). This spare current may supplement the current supplied to peripheral 105 from host device 103, and hub2 (see discussion below) thereby enabling peripheral 105 to operate from power wholly supplied through bus connections. According to the embodiment shown in FIG. 8, hub1 101(*a*) draws current from port 2 of host device 103.

According to the embodiment shown in FIG. 8, hub2 101(*b*) may supply 100 mA of the 500 mA of current drawn from host device 103 to external device 107(*b*). In addition, 375 mA of surplus current may also be supplied to peripheral 105 by hub2 (500 mA minus 25 mA consumed minus 100 mA supplied to external device 107(*a*)). This spare current may supplement the current supplied to peripheral 105 from host device 103, and hub1 (see above discussion) thereby enabling peripheral 105 to operate from power wholly supplied through bus connections. According to the embodiment shown in FIG. 8, hub2 101(*a*) draws current from port 3 of host device.

Peripheral 105 receives current inputs from host device 103, hub1 101(*a*) and hub2 101(*b*). The peripheral 105 may receive 375 mA of surplus current supplied to it from hub1, and 375 mA of surplus current supplied to it from hub2 through its auxiliary input via upstream connections. The current thus supplied may serve to augment the current (e.g., 500 mA) supplied to it from a host port. In one embodiment, this current may be derived from hub1 and hub2 to power a USB peripheral function such as a USB mass storage device when the USB host port cannot provide sufficient current to power the peripheral function. The total current supplied according to this embodiment of the present invention may be calculated using the formula:

$$P_{Total} = P_{HUB1\ POWER\ OUTPUT} + P_{HUB2\ POWER\ OUTPUT} + P_{USB\ HOST\ PORT\ OUTPUT}.$$

External devices 107(a) and 107(b) receive data signals and power inputs via downstream ports (e.g., 111) from hub1 101(a) and hub2 101(b) respectively. According to one embodiment, 100 mA of power may be supplied to each of the external devices via its connection to a hub. External devices 107(a) and 107(b) may include but are not limited to a USB mouse, and may include any bus connected peripheral.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A serial communication hub comprising:
    an input communication port for receiving input power and for receiving and transmitting communication signals;
    a downstream communication port for supplying power to a downstream device and for receiving and transmitting communication signals;
    an upstream power output port; and
    a power switch for supplying output power to said power output port, said output power provisioned for a bus-powered peripheral.

2. A serial communication hub as described in claim 1 wherein said input communication port is for coupling with a first port of a host device and wherein said bus-powered peripheral is for coupling with a second port of said host device for receiving power and communication signals therefrom.

3. A serial communication hub as described in claim 2 further comprising a hub controller coupled to said input communication port and coupled to said power switch.

4. A serial communication hub as described in claim 2 wherein said input communication port receives substantially 500 milliamps of current from said host device and supplies substantially 100 milliamps of current through said downstream communication port.

5. A serial communication hub as described in claim 4 wherein said power switch supplies at least 300 milliamps of current through said power output port.

6. A serial communication hub as described in claim 5 wherein said peripheral device receives substantially 500 milliamps of current from said host device and requires more than 500 milliamps of power for operation.

7. A serial communication hub as described in claim 1 wherein said communication signals are substantially compliant with the Universal Serial Bus (USB) bus protocol.

8. A Universal Serial Bus (USB) hub comprising:
    an input USB port for receiving input power from a first USB port of a host device;
    a power output port; and
    a power switch for supplying output power to said power output port, said output power provisioned for a bus-powered peripheral and wherein said peripheral is for coupling to a second power output port of said host device that is located upstream.

9. A USB hub as described in claim 8 and further comprising a downstream USB port for supplying power to a downstream USB device.

10. A USB hub as described in claim 8 wherein said power output port is for coupling to said peripheral device using an auxiliary power port of said peripheral.

11. A USB hub as described in claim 9 wherein said power output port is for coupling to said peripheral using an auxiliary power port of said peripheral.

12. A USB hub as described in claim 9 further comprising a hub controller coupled to said input USB port and coupled to said power switch, said hub controller for regulating power supplied by said power switch.

13. A USB hub as described in claim 9 wherein said input USB port receives substantially 500 milliamps of current from said host device and supplies 100 milliamps of current over said downstream USB port.

14. A USB hub as described in claim 13 wherein said power switch supplies at least 300 milliamps of current over said power output port for said peripheral.

15. A USB hub as described in claim 14 wherein said peripheral receives substantially 500 milliamps of power from said host device and requires more than 500 milliamps of power for operation.

16. A method of supplying auxiliary power to a bus-powered peripheral comprising:
    a) supplying power from a first USB port of a host device to an input USB port of a USB hub device;
    b) supplying power through a downstream USB port of said USB hub device for use by a downstream USB device;
    c) supplying auxiliary power through an upstream power output port of said USB hub device for use by a peripheral device that is coupled to said power output port; and
    d) supplying power from a second USB port of said host device to said peripheral device, wherein said power received by said peripheral device at said c) and said d) is sufficient for its operation.

17. A method as described in claim 16 wherein said downstream USB device is a cursor control device.

18. A method as described in claim 16 wherein said peripheral device is a hard disk drive.

19. A method as described in claim 16 wherein said peripheral device requires more power for operation than that supplied from said host device.

20. A method as described in claim 16 wherein said b) supplies substantially 100 milliamps of current to said downstream USB device said c) supplies at least 300 milliamps of current to said peripheral device and said d) supplies at substantially 500 milliamps of current to said peripheral device.

* * * * *